з,153,639
METHOD OF CURING POLYMERIC MATERIALS
AND THE PRODUCT THEREOF
Gerard Kraus and Jerry T. Gruver, Bartlesville, Okla.,
assignors to Phillips Petroleum Company, a corporation
of Delaware
No Drawing. Filed Nov. 5, 1959, Ser. No. 851,011
22 Claims. (Cl. 260—85.1)

This invention relates to a method of curing polymeric materials. In another aspect it relates to the process of reacting polymeric materials with an improved curing system. In still another aspect this invention relates to the resulting cured products of this process.

Many polymeric materials, particularly the unsaturated rubbery polymers, require a curing or cross linking treatment to place them in a useful condition. In addition other polymers such as polyethylene or polypropylene can be improved in certain properties, i.e., thermal stability, by cross linking. Several chemical curvatives are well known and are in commercial use. Each has its peculiar advantages but frequently gains made in one property of the polymer are at the expense of another property.

We have discovered two classes of chemical curatives which when used together in polymeric materials produce a cumulative effect that is superior to the sum of the effects of each curative used individually. In other words we have found an unexpected synergism to exist in the combined action of two entirely different types of chemicals on the properties of polymeric materials. Our invention, therefore, resides in the method of curing or treating certain polymers by reacting them with two materials in combination. These materials are (1) organic peroxides and (2) tri(aziridinyl) phosphine oxides or sulfides. The polymers curable with this system include natural rubber, synthetic polymers of monomers containing a vinylidene group, and synthetic polymers having the formula $AY_n$ where A comprises a polymer of monomers containing a vinylidene group, Y is an acidic group, and $n$ is an integer of at least 2 and generally 2, 3 or 4. The tri(aziridinyl) phosphine oxides or sulfides have the general formula

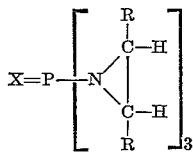

wherein X is oxygen or sulfur and each R is hydrogen or an alkyl, cycloalkyl, aryl, aralkyl or alkaryl radical. The R groups can be alike or different and together can contain up to 20 carbon atoms.

It is an object of our invention to provide a method of curing polymeric materials with an improved curing system.

It is another object of our invention to provide a process wherein a polymeric material can be reacted with two different curatives to produce an improvement in physical properties of the material.

Another object is to provide a polymeric material having improved physical properties as a result of having been reacted with an improved two-component curing system.

Other objects, advantages and features of our invention will become apparent to those skilled in the art from the following discussion.

The materials which can be treated for improvements in properties according to our invention are natural rubber and polymers of vinylidene compounds which are polymerizable to high molecular weights. Included among these polymers are homopolymers of conjugated dienes having from 4 to 12 carbon atoms, preferably the conjugated dienes having 4 to 8 carbon atoms per molecule such as 1,3-butadiene, isoprene, piperylene, methylpentadiene, 2-methyl-1,3-hexadiene, phenylbutadiene, 3,4-dimethyl-1,3-hexadiene, 4,5-diethyl-1,3-octadiene fluoroprene, chloroprene, and the like. Among these butadiene, isoprene and piperylene are preferred. In addition, suitable materials include copolymers of the above-mentioned conjugated dienes with compounds containing a vinylidene group, such as isobutylene, styrene, p-methoxystyrene, vinylnaphthalene, vinyltoluene, heterocyclic nitrogen-containing monomers such as pyridine and quinoline derivatives containing at least one vinyl or alphamethylvinyl group, such as 2-vinylpyridine and 2-methyl-5-vinylpyridine, acrylic and alkacrylic acid esters, such as methyl acrylate, ethyl acrylate, and methyl methacrylate, methyl vinyl ether, vinyl chloride, vinylidene chloride, and the like. Polymers containing acidic groups along the polymer chain, such as polymers of acrylic acid or methacrylic acid, can be cured with our system. Our curing system can also be used to treat polymers of monoolefins having 2 to 8 carbon atoms such as polyethylene, polypropylene, polybutene, copolymer of ethylene with propylene or 1-butene, and the like.

In addition to the above materials, our process has particular utility in treating terminally reactive polymers containing terminal acidic groups. As used herein, the term "terminally reactive polymer" denotes polymer containing a reactive group on both ends of the polymer chain.

Polymers containing terminal acidic groups can be prepared from polymers containing terminal alkali metal atoms.

The monomers which can be employed in the preparation of polymers containing terminal alkali metal atoms include a wide variety of materials. The preferred monomers are the conjugated dienes containing from 4 to 12 carbon atoms and preferably 4 to 8 carbon atoms, such as 1,3-butadiene, isoprene, piperylene, methylpentadiene, phenylbutadiene, 3,4-dimethyl-1,3-hexadiene, 4,5-diethyl-1,3-octadiene, etc. In addition, conjugated dienes containing reactive substituents along the chain can also be employed, such as for example, halogenated dienes, such as chloroprene, fluoroprene, etc. Of the conjugated dienes, the preferred material is butadiene, with isoprene and piperylene also being especially suitable. In addition to the conjugated dienes, other monomers which can be employed are aryl-substituted olefins, such as styrene, various alkyl styrenes, such as vinyltoluene, paramethoxystyrene, vinylnaphthalene, and the like; heterocyclic nitrogen-containing monomers, such as pyridine and quinoline derivatives containing at least 1 vinyl or alphamethylvinyl group, such as 2-vinylpyridine, 3-vinylpyridine, 4-vinylpyridine, 2-ethyl-5-vinylpyridine, 2-methyl-5-vinylpyridine, 3,5-diethyl-4-vinylpyridine, etc.; similar mono- and di-substituted alkenyl pyridines and like quinolines; acrylic acid esters, such as methyl acrylate, ethyl acrylate; alkacrylic acid esters, such as methyl methacrylate, ethyl methacrylate, propyl methacrylate, ethyl ethacrylate, butyl methacrylate; methyl vinyl ether, vinyl chloride, vinylidene chloride, vinylfuran, vinylcarbazole, vinylacetylene, etc.

The above compounds in addition to being polymerizable alone are also copolymerizable with each other and may be copolymerized to form terminally reactive polymers. In addition, copolymers can be prepared using minor amounts of copolymerizable monomers containing more than one vinylidene group such as 2,4-divinylpyridine, divinylbenzene, 2,3-divinylpyridine, 3,5-divinylpyridine, 2,4-divinyl-6-methylpyridine, 2,3-divinyl-5-ethylpyridine, and the like.

The terminally reactive polymers in addition to including homopolymers and copolymers of the above materials also include block polymers, which are formed by polymerizing a monomer onto the end of a polymer, the monomer being introduced in such a manner that substantially all of the co-reacting molecules enter the polymer chain at this point. In general, the block polymers can include combinations of homopolymers and copolymers of the materials hereinbefore set forth. A detailed description of block polymers containing terminal reactive groups and their method of preparation is set forth in the copending application of R. P. Zelinski, Serial No. 796,277, filed March 2, 1959.

The terminally reactive polymers are prepared by contacting the monomer or monomers which it is desired to polymerize with an organo polyalkali metal compound. The organo polyalkali metal compounds preferably contain from 2 to 4 alkali metal atoms, and those containing 2 alkali metal atoms are more often employed. As will be explained hereinafter, lithium is the preferred alkali metal.

The organo polyalkali metal compounds can be prepared in several ways, for example, by replacing halogens in an organic halide with alkali metals, by direct addition of alkali metals to a double bond, or by reacting an organic halide with a suitable alkali metal compound.

The organo polyalkali metal compound initiates the polymerization reaction, the organo radical being incorporated in the polymer chain and the alkali metal atoms being attached at each end of the polymer chain. The polymers in general will be linear polymers having two ends; however, polymers containing more than two ends can be prepared within the scope of the invention. The general reaction can be illustrated graphically as follows:

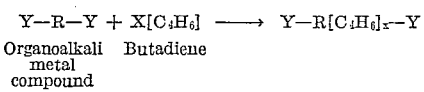

or

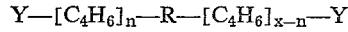

or combinations thereof.

A specific example is:

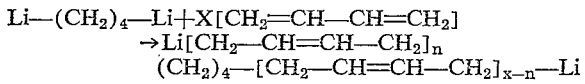

In the specific example, 1,4-addition of butadiene is shown; however, it should be understood that 1,2-addition can also occur.

While organo compounds of the various alkali metals can be employed in carrying out the polymerization, by far the best results are obtained with organolithium compounds which give very high conversions to the terminally reactive polymer. With organo compounds of the other alkali metals, the amount of monoterminally reactive polymer, that is, polymer having alkali metal at only one end of the chain is substantially higher. The alkali metals, of course, include sodium, potassium, lithium, rubidium, and cesium. The organic radical of the organo polyalkali metal compound can be an aliphatic, cycloaliphatic or aromatic radical. For example, di- and polyalkali metal substituted hydrocarbons can be employed including 1,4-dilithiobutane,
1,5-dipotassiopentane,
1,4-disodio-2-methylbutane,
1,6-dilithiohexane,
1,10-dilithiodecane,
1,15-dipotassiopentadecane,
1,20-dilithioeicosane,
1,4-disodio-2-butene,
1,4-dilithio-2-methyl-2-butene,
1,4-dilithio-2-butene,
1,4-dipotassio-2-butene,
dilithionaphthalene,
disodionaphthalene,
4,4'-dilithiobiphenyl,
disodiophenanthrene,
dilithioanthracene,
1,2-dilithio-1,1-diphenylethane,
1,2-disodio-1,2,3-triphenylpropane,
1,2-dilithio-1,2-diphenylethane,
1,2-dipotassiotriphenylethane,
1,2-dilithiotetraphenylethane,
1,2-dilithio-1-phenyl-1-naphthylethane,
1,2-dilithio-1,2-dinaphthylethane,
1,2-disodio-1,1-diphenyl-2-naphthylethane,
1,2-dilithiotrinaphthylethane,
1,4-dilithiocyclohexane,
2,4-disodioethylcyclohexane,
3,5-dipotassio-n-butylcyclohexane,
1,3,5-trilithiocyclohexane,
1-lithio-4-(2-lithio-4-methylphenyl)butane,
1,2-dipotassio-3-phenylpropane,
1,2-di(4-lithiobutyl)-benzene,
1,3-dilithio-4-ethylbenzene,
1,4-dirubidiobutane,
1,8-dicesiooctane,
1,5,12-trilithiododecane,
1,4,7-trisodioheptane,
1,4-di(1,2-dilithio-2-phenylethyl)benzene,
1,2,7,8-tetrasodionaphthalene,
1,4,7,10-tetrapotassiodecane,
1,5-dilithio-3-pentyne,
1,8-disodio-5-octyne,
1,7-dipotassio-4-heptyne,
1,10-dicesio-4-decyne,
1,11-dirubidio-5-hendecyne,
1,2-disodio-1,2-diphenylethane,
dilithiophenanthrene,
1,2-dilithiotriphenylethane,
dilithiomethane,
1,4-dilithio-1,1,4,4-tetraphenylbutane,
1,4-dilithio-1,4-diphenyl-1,4-dinaphthylbutane, and the like.

While the organo dialkali metal initiators in general can be employed, certain specific initiators give better results than others and are preferred in carrying out the preparation of the terminally reactive polymers. For example, of the condensed ring aromatic compounds, the lithium anthracene adduct is preferred, but the adducts of lithium with naphthalene and biphenyl can be employed with good results. Of the compounds of alkali metals with polyaryl-substituted ethylenes, the preferred material is 1,2-dilithio-1,2-diphenylethane (lithium-stilbene adduct). In many instances, the compounds which are formed are mixtures of mono- and dialkali metal compounds, which are less effective in promoting the formation of the terminally reactive polymers. The organo dialkali metal compounds, which have been set forth as being preferred, are those which when prepared contain a minimum of the monoalkali metal compound.

The amount of initiator which can be used will vary depending on the polymer prepared, and particularly the molecular weight desired. Usually the terminally reactive polymers are liquids, having molecular weights in the range of 1000 to about 20,000. However, depending on the monomers employed in the preparation of the polymers and the amount of initiator used, semi-solid and solid terminally reactive polymers can be prepared having molecular weights up to 150,000 and higher. Usually the initiator is used in amounts between about 0.25 and about 100 millimoles per 100 grams of monomer.

Formation of the terminally reactive polymers is generally carried out in the range of between —100 and +150° C., preferably between —75 and +75° C. The particular temperatures employed will depend on both the monomers and the initiators used in preparing the polymers. For example, it has been found that the organolithium initiators provide more favorable results at elevated temperatures whereas lower temperatures are required to effectively initiate polymerization to the desired products with the other alkali metal compounds. The amount of catalyst employed can vary but is preferably in the range of between about 1 and about 30 millimoles per 100 grams of monomers. It is preferred that the polymerization be carried out in the presence of a suitable diluent, such as benzene, toluene, cyclohexane, methylcyclohexane, xylene, n-butane, n-hexane, n-heptane, isooctane, and the like. Generally, the diluent is selected from hydrocarbons, e.g., paraffins, cycloparaffins, and aromatics containing from 4 to 10 carbon atoms per molecule. As stated previously, the organodilithium compounds are preferred as initiators in the polymerization reaction since a very large percentage of the polymer molecules formed contain two terminal reactive groups, and also the polymerization can be carried out at normal room temperatures. This is not to say, however, that other organo alkali metal initiators cannot be employed; however, usually more specialized operation or treatment is required with these materials, including low reaction temperatures. Since it is desirable to obtain a maximum yield of terminally reactive polymer, it is within the scope of the invention to use separation procedures, particularly with alkali metal initiators other than lithium compounds, to separate terminally reactive polymer from the polymer product.

The terminally reactive polymers prepared as hereinbefore set forth contain an alkali metal atom on each end of the polymer chain and the organic radical of the initiator is present in the polymer chain. These terminally reactive polymers are treated with suitable reagents such as carbon dioxide, sulfuryl chloride, etc., and upon hydrolysis provide polymers containing terminal acidic groups. The acidic groups include groups such as SOH, $SO_2H$, $SO_3H$, COOH, $SeO_2H$, $SeO_3H$, $SnO_2H$, $SbO_2H$, SbOH, $SbO_3H$, $TeO_2H$, $TeO_3H$, $AsO_2H$, AsOH, $AsO_3H_2$, $AsO_3H_3$. Reaction of terminally reactive polymer containing alkali metal atoms with the acid forming reagents can be carried out over a wide range of temperatures, e.g., $-75°$ C. to $+75°$ C., and preferably utilizing an amount of reagent in excess of stoichiometric. The following reactions present examples of specific methods which can be employed to introduce the terminal acidic groups. In these equations, A designates a polymer chain.

(1) Li—A—Li+$2CO_2$→$LiCO_2$—A—$CO_2Li$
$LiCO_2$—A—$CO_2Li$+2HCl→
HOOC—A—COOH+2LiCl
(2) Li—A—Li+$SO_2Cl_2$→$LiSO_2Cl_2$—A—$SO_2Cl_2Li$
$LiSO_2Cl_2$—A—$SO_2Cl_2Li$+$2H_2O$→
$HO_3S$—A—$SO_3H$+2LiCl+2HCl

In accordance with our invention, the polymers containing terminal acidic groups are reacted with the combination of (1) an organic peroxide and (2) a tri(aziridinyl) phosphine oxide or sulfide. A general formula for the latter of these reactants has been given. Examples of specific phosphine oxides and sulfides include tri(1-aziridinyl)phosphine oxide,
tri(2-methyl-1-aziridinyl)phosphine oxide,
tri(2,3-dimethyl-1-aziridinyl)phosphine oxide,
tri(2-isopropyl-1-aziridinyl)phosphine oxide,
tri(2-methyl-3-ethyl-1-aziridinyl)phosphine oxide,
tri(2-isopropyl-1-aziridinyl)phosphine oxide,
tri(2-methyl-3-n-butyl-1-aziridinyl)phosphine oxide,
tri(2-hexyl-1-aziridinyl)phosphine oxide,
tri(2,3-diheptyl-1-aziridinyl)phosphine oxide,
tri(2-methyl-3-octyl-1-aziridinyl)phosphine oxide,
tri(2-ethyl-3-decyl-1-aziridinyl)phosphine oxide,
tri(2-dodecyl-1-aziridinyl)phosphine oxide,
tri(2-methyl-3-tridecyl-1-aziridinyl)phosphine oxide,
(2-ethyl-3-octadecyl-1-aziridinyl)phosphine oxide,
tri(2-eicosyl-1-aziridinyl)phosphine oxide,
tri(2 - methyl-3-cyclopentyl-1-aziridinyl)phosphine oxide,
tri(2-ethyl-3-cyclohexyl-1-aziridinyl)phosphine oxide,
tri[2-n-butyl-3-(4-methylcyclohexyl)1-aziridinyl]-phosphine oxide,
tri(2-phenyl-1-aziridinyl)phosphine oxide,
tri(2-phenyl-3-tetradecyl-1-aziridinyl)phosphine oxide,
tri(2,3-dephenyl-1-aziridinyl)phosphine oxide,
tri(2-tert-butyl-3-phenyl-1-aziridinyl)phosphine oxide,
tri[2-ethyl-3-(1-naphthyl)1-aziridinyl]phosphine oxide,
tri[2-n-propyl-3-(2-naphthyl)1-aziridinyl]phosphine oxide,
tri(2-methyl-3-benzyl-1-aziridinyl)phosphine oxide,
tri(2-nonyl-3-benzyl-1-aziridinyl)phosphine oxide,
tri[2-n-propyl-3-(2-phenylethyl)1-aziridinyl]phosphine oxide,
tri[2-methyl-3-(4-methylphenyl)1-aziridinyl]phosphine oxide,
tri[2-ethyl-3-(3-n-propylphenyl)1-aziridinyl]phosphine oxide,
tri[2-heptyl-3-(2,4-dimethylphenyl)1-aziridinyl]phosphine oxide,
tri(1-aziridinyl)phosphine sulfide,
tri(2-methyl-1-aziridinyl)phosphine sulfide,
tri(2,3-dimethyl-1-aziridinyl)phosphine sulfide,
tri(2,3-diethyl-1-aziridinyl)phosphine sulfide,
tri(2-methyl-3-isopropyl-1-aziridinyl)phosphine sulfide,
tri(2-tert-butyl-1-aziridinyl)phosphine sulfide,
tri(2,3-didecyl-1-aziridinyl)phosphine sulfide,
tri(2-ethyl-3-pentadecyl-1-aziridinyl)phosphine sulfide,
tri(2-eicosyl-1-aziridinyl)phosphine sulfide,
tri(2-methyl-3-cyclohexyl-1-aziridinyl)phosphine sulfide,
tri(2-phenyl-1-aziridinyl)phosphine sulfide,
tri(2-phenyl-3-benzyl-1-aziridinyl)phosphine sulfide,
tri(2,3-diphenyl-1-aziridinyl)phosphine sulfide,
tri(2-ethyl-3-phenyl-1-aziridinyl)phosphine sulfide,
tri(2-amyl-3-benzyl-1-aziridinyl)phosphine sulfide.

The organic peroxides used in the invention have the general formula

R'—O—O—R' wherein each R' is selected from the group consisting of alkyl, cycloalkyl, aryl, alkaryl, aralkyl and acyl radicals containing from 1 to 15 carbon atoms. Examples of specific suitable organic peroxides include dimethyl peroxide,
methyl ethyl peroxide,
di-tert-butyl peroxide,
di-tert-amyl peroxide,
di-n-hexyl peroxide,
n-butyl-n-amyl peroxide,
dicyclohexyl peroxide,
dicyclopentyl peroxide,
di(methylcyclohexyl) peroxide,
diphenyl peroxide,
di-4-tolyl peroxide,
di(2,4,6-trimethylphenyl) peroxide,
phenyl benzyl peroxide,
tert-butyl phenyl peroxide,
dibenzoyl peroxide,
diacetyl peroxide,
dibenzyl peroxide,
bis(α-methylbenzyl) peroxide,
bis(α-ethylbenzyl) peroxide,
bis(α-n-propylbenzyl) peroxide,
bis(α-isopropylbenzyl) peroxide,
bis(α,α-dimethylbenzyl) peroxide,
bis(α,α-diethylbenzyl) peroxide,
bis(α,α-di-n-propylbenzyl) peroxide,
bis(α,α-diisopropylbenzyl) peroxide,
bis(α-methyl-α-ethylbenzyl) peroxide,
bis(α-ethyl-α-isopropylbenzyl) peroxide,
bis(α-methyl-α-tert-butylbenzyl) peroxide, bis(α,α-dimethyl-3-methylbenzyl) peroxide,
bis(α,α-diethyl-2-ethylbenzyl) peroxide,
bis(α-methyl-α-ethyl-3-tert-butylbenzyl) peroxide,
bis(α,α-dimethyl-2,4-dimethylbenzyl) peroxide,
bis(α,α-dimethyl-4-isopropylbenzyl) peroxide,
bis(α,α-diisopropyl-4-ethylbenzyl) peroxide,
bis(α-methyl-α-ethyl-4-isopropylbenzyl) peroxide,
bis(α,α-diethyl-4-isopropylbenzyl) peroxide,
bis(α,α-diisopropyl-2-ethylbenzyl) peroxide,
bis(α,α-dimethyl-4-tert-butylbenzyl) peroxide,
bis(α,α-diethyl-4-tert-butylbenzyl) peroxide,
benzyl α-methylbenzyl peroxide,
benzyl α-methyl-4-methylbenzyl peroxide,
benzyl α-methyl-4-isopropylbenzyl peroxide,
benzyl α,α-dimethylbenzyl peroxide,
benzyl α,α-dimethyl-4-methylbenzyl peroxide,
benzyl α,α-dimethyl-4-isopropylbenzyl peroxide,
α,α,α'-trimethyldibenzyl peroxide,
α-methyl-α,α'-diethyl-α'-n-propyldibenzyl peroxide,
α-methyl-α,α',α'-triisopropyldibenzyl peroxide,
α,α-dimethylα',α'-di-n-butyldibenzyl peroxide,
bis[dimethyl(1-naphthyl)methyl] peroxide
and bis[diethyl(2-naphthyl)methyl] peroxide.

The amount of organic peroxide used in the curing system depends upon the polymer being treated. Generally, the amount of organic peroxide is in the range of 0.05 to 5 parts by weight per 100 parts of polymer. The amount of organic peroxide can be regulated to obtain a tight or an intermediate cure. The amount of tri(aziridinyl)-phosphine oxide or sulfide used is ordinarily in the range of 0.2 to 5 parts by weight per 100 parts of polymer. Ordinarily the ratio, in parts by weight, of tri(aziridinyl)-phosphine oxide or the corresponding sulfide to organic peroxide is at least 1:1 and usually an excess of the tri-(aziridinyl)phosphine compound is employed. In some instances, however, an excess of the peroxide is used, i.e., the ratio of tri(aziridinyl)phosphine to peroxide can be 0.7:1 part by weight or even lower. In treating polymers containing terminal acidic groups, it is preferred that at least a stoichiometric amount of the coupling agent be employed but an amount slightly below this can be used, e.g., from 80 or 90 percent stoichiometric to a large excess. It is preferred that the amount range from stoichiometric to a 30 percent excess.

The organic peroxide and tri(aziridinyl)phosphine compound can be incorporated into the polymer in the same manner used to add conventional additives or reactants to rubbery or plastic materials, for example, by combining the materials on a roll mill or in a Banbury mixer. The curing or reacting temperature can vary over a broad range, for example from 200 to 500° F., although the temperature is generally in the range of 260 to 350° F. The time can also vary considerably from a few minutes to several hours, although usually a curing time of from 20 to 150 minutes is used. Various types of compounding ingredients, including fillers, such as carbon blacks or mineral fillers, can be incorporated into the polymeric material if desired.

The invention provides a method for converting liquid, semisolid, and solid polymers to vulcanized rubbery and cross-linked plastic products. A wide variety of polymer compositions which are obtained when operating in accordance with the present invention include materials which are suitable as adhesives, potting compounds, tread stocks, and also for the manufacture of many types of molded objects. Polymers which contain unreacted terminal acidic groups adhere to metal surfaces. Thus, partially reacted or cured polymers are valuable for use in metal adhesive compositions. They can also be used in the production of laminates in which one or more of the plies are metals.

A better understanding of the invention can be gained from the following examples. The specific materials and conditions used are typical only and should not be construed to limit our invention unduly.

*Example 1*

A rubbery butadiene/styrene random copolymer was prepared in a 20-gallon reactor in accordance with the following recipe:

| | |
|---|---:|
| Butadiene _____parts by weight__ | 75 |
| Styrene _____do____ | 25 |
| Toluene _____do____ | 1000 |
| Tetrahydrofuran (0.1% hydroquinone) ___do____ | 1.0 |
| n-Butyllithium _____do____ | 0.20 |
| Shortstop: Water. | |
| Antioxidant: Phenyl-beta-naphthylamine, phr.[1] ___ | 2.0 |
| Polymerization temperature, ° F. _____ | 86 |

[1] Parts by weight per 100 parts rubber.

Toluene was charged first followed by a nitrogen purge. Styrene was then introduced followed by the tetrahydrofuran, butadiene, and finally the n-butyllithium. Polymerization was effected at 86° F. to 100 percent conversion.

Polymerization grade butadiene which was dried by liquid circulation through a series of silica gel columns was used for the polymerization. Technical grade toluene and polymerization grade styrene were employed after being dried by countercurrent purging with dry nitrogen in a packed column. n-Butyllithium was supplied by Orgmet of Wenham, Massachusetts, as a 1-molar solution in pentane.

At the conclusion of the polymerization, the reaction mixture was pressured into a 60-gallon blowdown tank containing water as a shortstop. The antioxidant, phenyl-beta-naphthylamine, was added as a 2.0 percent solution in toluene. The polymer solution was washed twice with water at room temperature and then steam stripped under vacuum to remove solvent and isolate the polymer which was then dried at 300° F. in an extrusion drier. It had a Mooney value (ML–4 at 212° F.) of 43, an inherent viscosity of 1.33, and was gel free.

The butadiene/styrene copolymer was compounded in accordance with the following recipes:

| | Parts by Weight | | | |
|---|---|---|---|---|
| | 1 | 2 | 3 | 4 |
| Butadiene/styrene copolymer | 100 | 100 | 100 | 100 |
| Philblack O [1] | 50 | 50 | 50 | 50 |
| Dicumyl peroxide [2] | 0.24 | -------- | 0.24 | 0.32 |
| Tri(2-methyl-l-aziridinyl)-phosphine oxide | -------- | 1 | 1 | 0.8 |

CURED 30 MINUTES AT 307° F.

| | | | | |
|---|---|---|---|---|
| 300% Modulus, p.s.i | 700 | -------- | 970 | 1,350 |
| Tensile, p.s.i | 1,000 | 150 | 1,510 | 2,060 |
| Elongation, percent | 460 | 110 | 490 | 460 |

CURED 60 MINUTES AT 307° F.

| | | | | |
|---|---|---|---|---|
| 300% Modulus, p.s.i | 790 | -------- | 1,440 | 1,890 |
| Tensile, p.s.i | 1,190 | 150 | 2,110 | 2,290 |
| Elongation, percent | 440 | 140 | 430 | 360 |
| Resilience, percent | 62 | 58 | 66.4 | 68 |
| ΔT, ° F | 112.3 | ([3]) | 83.3 | 69.9 |

[1] High abrasion furnace black.
[2] Di-cup 40 C: A product containing 40% active dicumyl peroxide and 60% precipitated CaCO₃. Amount charged: 0.6 part in runs 1 and 3 and 0.8 part in run 4.
[3] Too soft.

These data demonstrate the synergistic action of the combined curatives. At both cure levels, the modulus and tensile strength of each sample which contained both curatives was much higher than the combined moduli and combined tensile strengths obtained from recipes 1 and 2. The stocks containing the combined curatives also have a higher resilience than the products from either recipe 1 or 2 and the products from recipes 3 and 4 show a noteworthy improvement in heat build-up over the stocks containing either dicumyl peroxide or tri(2-methyl-1-aziridinyl)phosphine oxide.

Example II

The following ingredients were charged to a 1-liter reactor for the purpose of preparing 1,2-dilithio-1,2-diphenylethane:

| | |
|---|---|
| Trans-stilbene, grams | 18 (0.1 mole) |
| Lithium wire, grams | 3.47 (0.5 mole) |
| Diethyl ether, anhydrous, ml. | 550 |
| Tetrahydrofuran, ml.[1] | 50 |

[1] Refluxed and distilled from lithium aluminum hydride.

The reactor was provided with a high speed stirrer, a gas inlet, a condenser, and a wide-throated solids funnel. The apparatus was first swept with prepurified nitrogen for 15 minutes after which the ingredients were charged and the mixture refluxed one hour. The mixture was siphoned from the excess lithium wire and used for the polymerization of butadiene in accordance with the following recipe:

| | |
|---|---|
| Butadiene, parts by weight | 100 |
| Cyclohexane, parts by weight | 1500 |
| 1,2-dilithio-1,2-diphenylethane, millimoles | 2.1 |
| Temperature, °F | 122 |
| Time, hours | 1.5 |
| Conversion | Quantitative |

Polymerization was effected in a 2-liter reactor. The cyclohexane was charged first, the reactor was purged with prepurified nitrogen, 1,2-dilithio-1,2-diphenylethane was added, and then butadiene. Immediately following polymerization the unquenched reaction mixture was carbonated using a T-tube. The polymer solution and carbon dioxide were fed into separate arms of the tube where they were mixed and passed through the other arm of the tube which was dipped into a mixture of toluene and Dry Ice. A gelatinous mass formed which became fluid upon acidification with hydrochloric acid. The polymer was coagulated with isopropanol, washed with isopropanol containing a small amount of phenyl-beta-naphthylamine, and then dried in a vacuum oven. Eight runs were made and the rubbery products were blended. Mooney value (ML-4 at 212° F.) of the polymer blend was 28.

The polymer blend was cured using two recipes as follows:

| | Parts by Weight | |
|---|---|---|
| | A | B |
| Polymer blend | 100 | 100 |
| Carbon black (Philblack O) | 50 | 50 |
| Dicumyl peroxide | 0.5 | 0.5 |
| Tri(2-methyl-1-aziridinyl) phosphine oxide | | 1.0 |

The compositions were cured 30 minutes at 307° F. The following physical properties were obtained on the cured stocks:

| Stock from recipe | $V_r$ | Tensile, p.s.i. | Elongation, percent | Resilience, percent | $\Delta T$, °F. | Shore Hardness | NBS Abrasion, rev/mil |
|---|---|---|---|---|---|---|---|
| A | 0.347 | 1,580 | 280 | 71.0 | 62.8 | 63 | 18.4 |
| B | 0.393 | 2,320 | 250 | 78.5 | 50.3 | 67 | 319 |

$V_r$—reciprocal swelling ratio in n-heptane (see Rubber World, vol. 135, 1, pp. 67–73, 1956 and vol. 135, 2, pp. 254–260, 1956).

These data show a marked improvement in tensile strength, resilience, heat build-up, and abrasion resistance when dicumyl peroxide is used along with the tri(2-methyl-1-aziridinyl)phosphine oxide.

Example III

The following ingredients were charged to a quart bottle for the purpose of preparing 1,2-dilithio-1,2-diphenylethane:

| | |
|---|---|
| Diethyl ether, anhydrous, ml | 600 |
| Tetrahydrofuran, ml | 60 |
| Trans-stilbene, grams | 27 |
| Lithium wire, grams | 3.5 |

The reaction was carried out at room temperature (about 25° C.) in an atmosphere of nitrogen.

Butadiene was polymerized in a 2-gallon reactor in accordance with the following recipe using 1,2-dilithio-1,2-diphenylethane as the initiator:

| | |
|---|---|
| Butadiene, parts by weight | 100 |
| Cyclohexane, parts by weight | 1500 |
| 1,2-dilithio-1,2-diphenylethane, mmoles | 2.5 |

A nitrogen atmosphere was maintained in the reactor at all times. The cyclohexane was charged first and heated to 50° C. after which the initiator was added. Butadiene was introduced from a bomb over a 20-minute period to aid temperature control. The total reaction time, from the beginning of addition of butadiene, was 3.5 hours. The unquenched polymer solution was carbonated in the manner described in Example I. After coagulation of the polymer in isopropanol, about 2 weight percent of phenyl-beta-naphthylamine was worked into the wet crumb. The product was dried for approximately 16 hours in a vacuum oven at 60° C. It was a rubbery material which had a carboxy content of 0.076 weight percent, an inherent viscosity of 2.17, and a Mooney value (ML-4 at 212° F.) of 47.

The polymer containing carboxy end groups was compounded in the following recipes:

| | Parts by Weight | | | |
|---|---|---|---|---|
| | A | B | C | D |
| Carboxy-containing polymer | 100 | 100 | 100 | 100 |
| Carbon black (Philblack O) | 50 | 50 | 50 | 50 |
| Dicumyl peroxide | 0.5 | 0.5 | 0.5 | 0.5 |
| Tri(2-methyl-1-aziridinyl) phosphine oxide | | 1 | 2 | 3 |

The compounds were cured 30 minutes at 307° F. Results of determination of physical properties are shown below:

| Stock from recipe | $V_r$ | Tensile, p.s.i. | Elongation, percent |
|---|---|---|---|
| A | 0.300 | 1,320 | 340 |
| B | 0.349 | 1,480 | 230 |
| C | 0.364 | 1,690 | 250 |
| D | 0.379 | 1,860 | 220 |

Example IV 1,2-dilithio-1,2-diphenylethane was prepared in accordance with the following recipe:

| | |
|---|---|
| Diethyl ether, anhydrous, ml | 450. |
| Tetrahydrofuran, ml | 50. |
| Trans-stilbene, grams | 18 (0.1 mole). |
| Lithium wire, grams | 2.1 (0.3 gram atom). |

The reaction was carried out at 122° F. for one hour. Conversion was quantitative.

The 1,2-dilithio-1,2-diphenylethane was used as the initiator for the copolymerization of butadiene with styrene. The recipes employed were as follows:

| | 1 | 2 |
|---|---|---|
| Butadiene, parts by weight | 77 | 77 |
| Styrene, parts by weight | 23 | 23 |
| Cyclohexane, parts by weight | 1,200 | 1,200 |
| 1,2-Dilithio-1,2-diphenylethane, mmoles | 3.5 | 2.8 |
| Temperature, °F | 122 | 122 |
| Time, hours | 1.5 | 1.5 |
| | ([1]) | ([1]) |

[1] Quantitative.

Cyclohexane was charged first after which the reactor was purged with nitrogen. Styrene was introduced followed by the butadiene and then the initiator. At the conclusion of the polymerization, each of the unquenched polymerization mixtures was treated with chloromethylphosphonic dichloride, 14 millimoles being added to the reaction mixture from recipe 1 and 5.6 millimoles being added to the reaction mixture from recipe 2. Excess water was added, the mixtures were washed with water, and the polymers were coagulated with isopropanol and dried in a vacuum oven. The products contained —POOH end groups. A blend was prepared using 360 grams of product from recipe 1 (ML–4 at 212° F., 27) and 430 grams of product from recipe 2 (ML–4 at 212° F., 68). The blend had a Mooney value of 40. It was compounded in accordance with the following recipes:

|  | Parts by Weight | |
|---|---|---|
|  | A | B |
| POOH-containing polymer | 100 | 100 |
| Carbon black (Philblack O) | 50 | 50 |
| Dicumyl peroxide [1] | 0.17 | 0.17 |
| Tri(2-methyl-1-aziridinyl) phosphine oxide | | 1 |

[1] Used as 40 weight percent dicumyl peroxide supported on calcium carbonate. Amount of this material used was 0.425 part.

The stocks were cured 30 minutes at 307° F. Results of determination of physical properties are as follows:

| Stock from Recipe | 300% Modulus, p.s.i. | Tensile, p.s.i. | Elongation, percent | Shore Hardness |
|---|---|---|---|---|
| A | 540 | 760 | 480 | 60 |
| B | 1,120 | 1,210 | 330 | 64 |

These data show the improvement in 300% modulus and tensile strength when the rubbery polymer is cured in a system which contains the peroxide in conjunction with the triaziridinyl phosphine oxide.

*Example V*

Butadiene was copolymerized with styrene in accordance with the following recipe:

| | |
|---|---|
| Butadiene parts by weight | 77 |
| Styrene do | 23 |
| Toluene do | 864 |
| 1,2-dilithio-1,2-diphenylethane do | 0.25 (1.3 mmoles) |
| Tetrahydrofuran do | 1.5 |
| Temperature, ° F. | 122 |
| Time, hours | 2 |
| Conversion | Quantitative |

Toluene was charged first and the reactor was then purged with nitrogen. Butadiene was introduced followed by styrene, tetrahydrofuran, and 1,2-dilithio-1,2-diphenylethane, in that order. The polymer had a Mooney value (ML–4 at 212° F.) of 37, an inherent viscosity of 1.65, and was gel free.

Immediately following the polymerization, the unquenched reaction mixture was carbonated using the T-tube technique. Carbon dioxide, under a pressure of 15–18 p.s.i.g., and the polymer solution were fed into separate arms of the tube where they were mixed. The reaction mixture was transferred to an open vessel through the third arm of the tube. The carbonated polymer was in the form of a very finely divided gel which had the appearance of snow. Dilute hydrochloric acid was added, the polymer solution was washed with water, and the polymer was coagulated with isopropanol containing phenyl beta-naphthylamine (one weight percent based on rubber). The product was then dried in a vacuum oven. The carboxy-containing polymer had a Mooney value (ML–4 at 212° F.) of 49. This polymer was compounded in accordance with the following recipes:

| | Parts by Weight | | | |
|---|---|---|---|---|
| | A | B | C | D |
| Carboxy-containing polymer | 100 | 100 | 100 | 100 |
| Carbon black (Philblack O) | 50 | 50 | 50 | 50 |
| Dicumyl peroxide | 0.6 | | 0.6 | 0.8 |
| Tri(2-methyl-1-aziridinyl) phosphine oxide | | 1 | 1 | 0.8 |

30 MINUTE CURE AT 307° F.

| | | | | |
|---|---|---|---|---|
| 300% Modulus, p.s.i. | 630 | | 1,690 | 1,810 |
| Tensile, p.s.i. | 1,490 | 270 | 3,120 | 3,210 |
| Elongation, percent | 670 | 260 | 480 | 460 |

60 MINUTE CURE AT 307° F.

| | | | | |
|---|---|---|---|---|
| 300% Modulus, p.s.i. | 800 | | 2,330 | 2,590 |
| Tensile, p.s.i. | 1,770 | 260 | 3,110 | 2,870 |
| Elongation, percent | 600 | 250 | 370 | 320 |
| Resilience, percent | 67.6 | 70.5 | 74.8 | 74.7 |
| ΔT, ° F. | 83.6 | ([1]) | 53 | 51.3 |

[1] Too soft to run.

It should be noted that at both cure levels, the tensile strength of each sample which contained both curatives was much higher than the combined tensile strengths obtained in samples from recipes A and B. These results demonstrate the synergistic effect which results from the combined curing agents.

As will be apparent to one skilled in the art from the above disclosure, various modifications can be made in the invention without departing from the spirit or scope thereof.

We claim:

1. A process which comprises reacting a polymeric material selected from the group consisting of natural rubber and synthetic polymers of monomers selected from the group consisting of conjugated dienes having 4 to 12 carbon atoms and monoolefins having 2 to 8 carbon atoms with the combination of an organic peroxide having the formula $$R'—O—O—R'$$

wherein each R' is selected from the group consisting of alkyl, cycloalkyl, aryl, alkaryl, aralkyl and acyl and contains 1 to 15 carbon atoms, and a reactant material having the formula

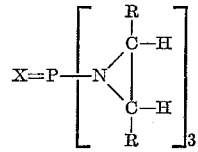

where X is selected from the group consisting of oxygen and sulfur and each R is selected from the group consisting of hydrogen, alkyl, cycloalkyl, aryl, aralkyl, and alkaryl radicals, the total of said R groups containing up to 20 carbon atoms.

2. The process of claim 1 wherein said polymeric material is polybutadiene.

3. The process of claim 1 wherein said polymeric material is a copolymer of butadiene and styrene.

4. The process of claim 1 wherein said polymeric material is a polyethylene.

5. The process of claim 1 wherein said polymeric material is polypropylene.

6. The process of claim 1 wherein said polymeric material is a copolymer of ethylene and 1-butene.

7. The process of claim 1 wherein said polymeric material is a copolymer of ethylene and propylene.

8. The process of claim 1 wherein said polymeric material is polyisoprene and said organic peroxide is di-tert-butyl peroxide.

9. The process of claim 1 wherein said organic peroxide is dicumyl peroxide.

10. The process of claim 1 wherein said reactant material is tri(2-methyl-1-aziridinyl)phosphine oxide.

11. A process which comprises mixing 100 parts by weight of a polymeric material selected from the group consisting of natural rubber and synthetic polymers of monomers selected from the group consisting of conjugated dienes having 4 to 12 carbon atoms and monoolefins having 2 to 8 carbon atoms with from 0.05 to 5 parts by weight of an organic peroxide having the formula

wherein each R′ is selected from the group consisting of alkyl, cycloalkyl, aryl, alkaryl, aralkyl and acyl and contains 1 to 15 carbon atoms, and 0.02 to 5 parts by weight of a reactant material having the formula

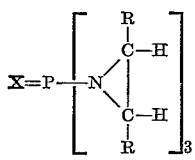

where X is selected from the group consisting of oxygen and sulfur and each R is selected from the group consisting of hydrogen, alkyl, cycloalkyl, aryl, aralkyl, and alkaryl radicals, the total of said R groups containing up to 20 carbon atoms, and heating the resulting mixture to produce a cured product.

12. The process of claim 11 wherein said polymeric material is a copolymer of butadiene and styrene containing terminal acid groups.

13. The process of claim 11 wherein said polymeric material is a polymer of butadiene containing terminal carboxy groups.

14. The composition prepared by the process of claim 21.

15. The composition prepared by the process of claim 1.

16. The composition prepared by the process of claim 20.

17. The composition prepared by the process of claim 11.

18. The composition prepared by the process of claim 12.

19. A process which comprises mixing 100 parts by weight of a copolymer of butadiene and styrene with from 0.05 to 5 parts by weight of dicumyl peroxide and 0.02 to 5 parts by weight of tri(2-methyl-1-aziridinyl) phosphine oxide and heating the resulting mixture at a temperature in the range of 200 to 500° F.

20. A process which comprises mixing 100 parts by weight of polybutadiene with from 0.05 to 5 parts by weight of dicumyl peroxide and 0.02 to 5 parts by weight of tri(2-methyl-1-aziridinyl) phosphine oxide and heating the resulting mixture at a temperature in the range of 200 to 500° F.

21. The process of claim 1 wherein said polymeric material is a polymer of a conjugated diene and has at least two terminal acidic groups per molecule.

22. The process of claim 11 wherein said polymeric material is a polymer of a conjugated diene and has at least two terminal acidic groups per molecule.

References Cited in the file of this patent

UNITED STATES PATENTS

| | | |
|---|---|---|
| 2,303,593 | Borger et al. | Dec. 1, 1942 |
| 2,460,581 | Jansen | Feb. 1, 1949 |
| 2,478,694 | Hineline | Aug. 9, 1949 |
| 2,728,806 | Morris | Dec. 27, 1955 |
| 2,819,255 | Boardman | Jan. 7, 1958 |
| 2,845,411 | Willis | July 29, 1958 |
| 2,906,592 | Reeves et al. | Sept. 29, 1959 |
| 2,917,492 | Reeves et al. | Dec. 15, 1959 |